US009736203B2

(12) United States Patent
Dasgupta et al.

(10) Patent No.: US 9,736,203 B2
(45) Date of Patent: Aug. 15, 2017

(54) SYSTEM AND METHOD FOR VIRTUAL SOCIAL COLOCATION

(71) Applicant: ITTIAM SYSTEMS PTE. LTD., Singapore (SG)

(72) Inventors: Sattam Dasgupta, Bangalore (IN); Anil Kumar Agara Venkatesha Rao, Bangalore (IN)

(73) Assignee: ITTIAM SYSTEMS PTE. LTD., Singapore (SG)

( * ) Notice: Subject to any disclaimer, the term of this patent is extended or adjusted under 35 U.S.C. 154(b) by 375 days.

(21) Appl. No.: 14/058,311

(22) Filed: Oct. 21, 2013

(65) Prior Publication Data

US 2014/0297807 A1 Oct. 2, 2014

(30) Foreign Application Priority Data

Mar. 28, 2013 (IN) ............................ 1425/CHE/2013
Apr. 3, 2013 (IN) ............................ 1524/CHE/2013
Oct. 15, 2013 (IN) ............................ 4641/CHE/2013
Oct. 17, 2013 (IN) ............................ 4671/CHE/2013

(51) Int. Cl.
*G06F 15/16* (2006.01)
*H04L 29/06* (2006.01)

(52) U.S. Cl.
CPC ...... *H04L 65/4076* (2013.01); *H04L 65/4053* (2013.01)

(58) Field of Classification Search
CPC ... H04L 65/4076; H04N 7/157; H04M 3/562; H04M 3/567; H04M 3/568; H04M 15/8072; H04M 2203/2088; H04M 2203/50; H04M 2203/5018; H04M 2203/5045; H04M 2203/5054; H04M 2203/5063; H04M 2203/5072; H04M 2203/5081; H04M 2215/7485; H04M 2250/62

See application file for complete search history.

(56) References Cited

U.S. PATENT DOCUMENTS 7,580,375 B1 * 8/2009 Friedrich ............ H04L 12/1822
348/14.01
2001/0044826 A1 * 11/2001 Ludwig .................. G06Q 10/10
709/204

(Continued)

*Primary Examiner* — Brian Whipple
*Assistant Examiner* — Anh Nguyen
(74) *Attorney, Agent, or Firm* — Prakash Nama; Global IP Services, PLLC

(57) ABSTRACT

A system and method for virtual social colocation with dynamic participation and audience among users with defined relationships are disclosed. In one embodiment, bridging of digital content and audio and/or video streams originating from one of first end points and incoming audio and/or video streams from remaining first end points is enabled on the one of the first end points. Further, first integrated audio and/or video streams and a second integrated audio and/or video stream are created based on the digital content and the audio and/or video streams originating from the one of the first end points and the incoming audio and/or video streams and sent to the remaining first end points and a virtual social colocation service (VSCS), respectively, by the one of the first end points. Also, the second integrated audio and/or video stream is broadcasted to the second end points by the VSCS.

33 Claims, 17 Drawing Sheets

(56) References Cited

U.S. PATENT DOCUMENTS

| | | | |
|---|---|---|---|
| 2002/0120501 A1* | 8/2002 | Bell | G06Q 30/0203 |
| | | | 705/14.31 |
| 2003/0002448 A1* | 1/2003 | Laursen | H04L 65/4038 |
| | | | 370/261 |
| 2007/0109978 A1* | 5/2007 | Miriyala | H04L 12/1813 |
| | | | 370/260 |
| 2011/0202594 A1* | 8/2011 | Ricci | H04M 3/4931 |
| | | | 709/203 |

* cited by examiner

| CONTROL | SCENARIO 1 | SCENARIO 2 | ... | USER DEFINED SCENARIO 'N' |
|---|---|---|---|---|
| VIDEO COMMUNICATION | YES | NO | | NO |
| VOICE COMMUNICATION | YES | YES | | YES |
| CHAT COMMUNICATION | YES | NO | | YES |
| AUDIO SHARE | YES | YES | | NO |
| IMAGE SHARE | YES | NO | | YES |
| VIDEO SHARE | NO | YES | | NO |
| FRONT CAMERA SHARE | NO | NO | | NO |
| BACK CAMERA SHARE | NO | NO | | NO |
| VIDEO/IMAGE SHARE SPEED (FRAMES/SECOND) | AUTO | AUTO | | 10 FPS |
| VIDEO RESOLUTION | SD | SD | | SD |
| APPLICATION 1 SHARE | YES | NO | | NO |
| APPLICATION 2 SHARE | NO | YES | | NO |
| ... | ... | ... | | ... |
| APPLICATION 'M' SHARE | NO | NO | | YES |

FIG. 1A

| PREDEFINED FORMATS | VIDEO COMM | VOICE COMM | CHAT COMM | AUDIO SHARE | IMAGE SHARE | VIDEO SHARE | FRONT CAMERA SHARE | BACK CAMERA SHARE | VIDEO/IMAGE SHARE SPEED (FRAMES/SECOND) | ... | MEDIA PLAYER | DOCUMENT VIEWER |
|---|---|---|---|---|---|---|---|---|---|---|---|---|
| MUSIC | NO | NO | YES | YES | NO | NO | NO | NO | AUTO | ... | NO | NO |
| PICTURE | NO | YES | NO | NO | YES | NO | NO | NO | 10 FPS | ... | NO | NO |
| VIDEO | NO | NO | YES | YES | NO | YES | NO | NO | 20 FPS | ... | YES | YES |
| MEETING | NO | YES | YES | NO | NO | NO | NO | NO | 10 FPS | ... | NO | YES |
| TUTOR | YES | NO | YES | NO | NO | NO | YES | NO | 20 FPS | ... | NO | YES |

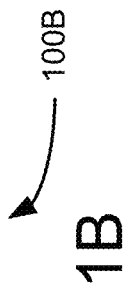

| SOCIAL | PROFESSIONAL | SEARCH TEXT |

MUSIC — LISTEN TO MUSIC WITH YOUR FRIENDS AND FAMILY AND CHAT OR TALK IF YOU WANT

PICTURE — VIEW PICTURES WITH YOUR FRIENDS AND FAMILY AND CHAT OR TALK - WITH MUSIC ON

VIDEO — WATCH VIDEOS WITH YOUR FRIENDS AND FAMILY AND CHAT OR TALK IF YOU WANT

EVENT — SHOOT AN EVENT, SHARE AND CONVERSE LIVE WITH FRIENDS AND FAMILY

TRAINING — TEACH OTHERS WITH NOTES, ANNOTATIONS AND WHILE BOARD - AVAILABLE TO ALL – LIVE

GROUP STUDY — SHARE NOTES, DISCUSS AND SOLVE PROBLEMS - LIVE

MEETING — PRESENT, DISCUSS AND DECIDE WITH SLIDES, DOCUMENTS AND WHITE BOARDS – LIVE

TRIP — PLAN A TRIP WITH FRIENDS AND FAMILY WITH SLIDES, DOCUMENTS AND WHITE BOARDS, MAPS

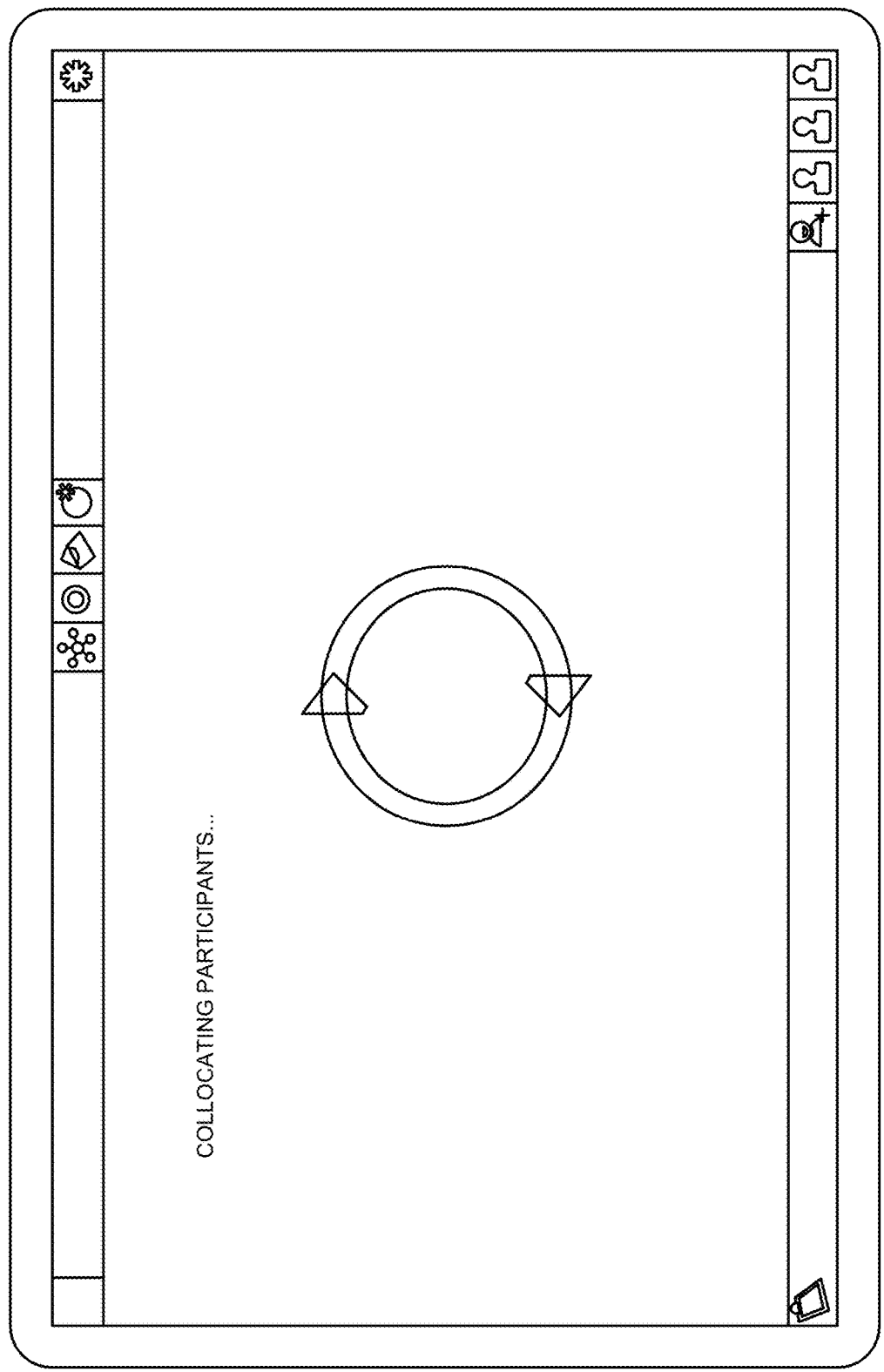

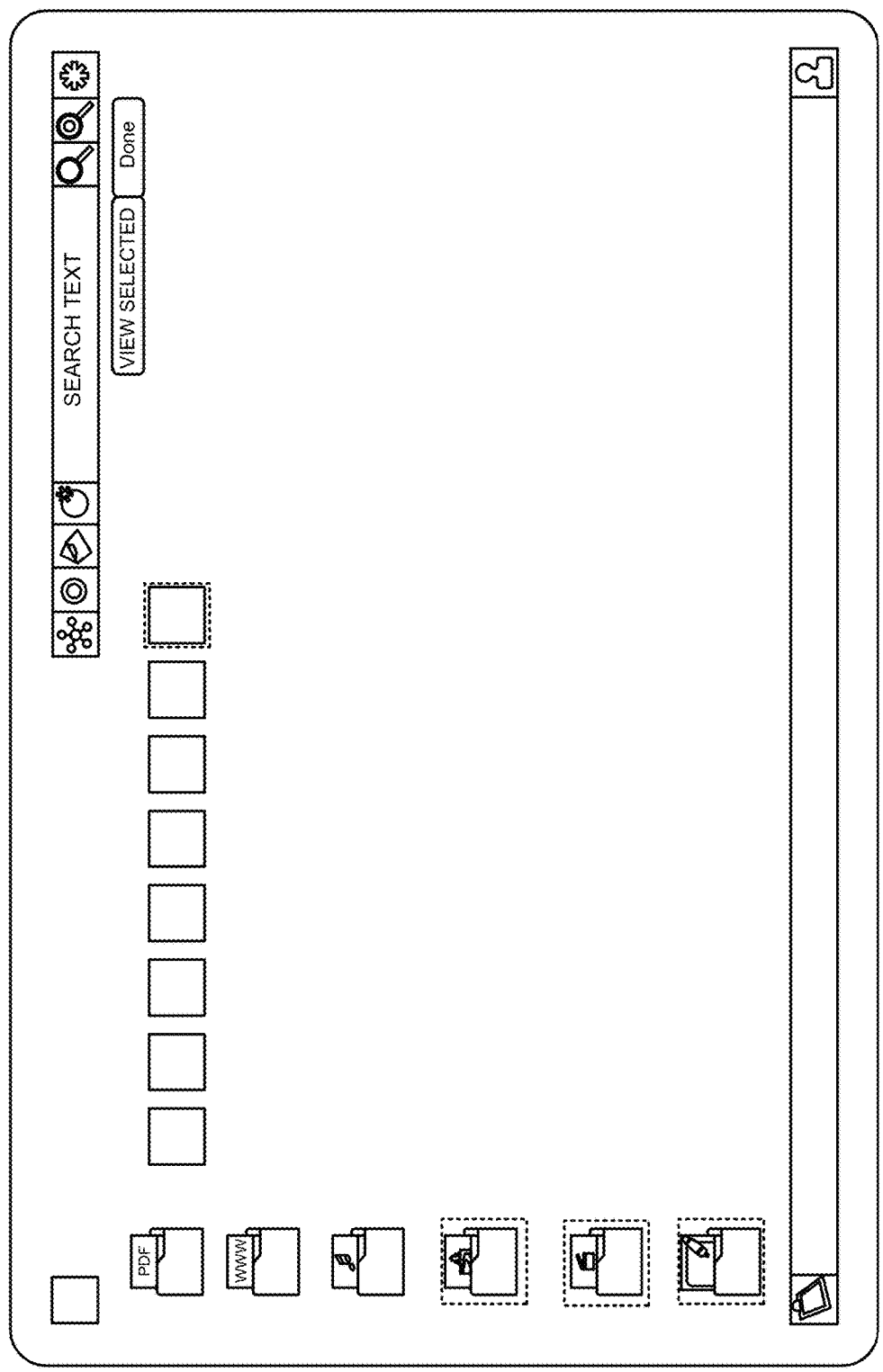

| FIELDS | VISIBILITY | DESCRIPTION |
|---|---|---|
| USER-ID | SELF | UNIQUE IDENTIFIER FOR THE USER |
| PASSWORD | NONE | |
| FIRST NAME | PUBLIC | |
| LAST NAME | PUBLIC | |
| EMAIL-ID | PUBLIC | |
| MOBILE NUMBER | FRIENDS/CUSTOM | |
| HOUSE NUMBER | FRIENDS/CUSTOM | |
| STREET | FRIENDS/CUSTOM | |
| STATE | | |
| ZIP CODE | | |
| COUNTRY | | |
| PROFESSION | FRIENDS/CUSTOM | |
| SCHOOL STUDIED IN | FRIENDS/CUSTOM | |
| COLLEGE STUDIED IN | FRIENDS/CUSTOM | |
| HIGHEST DEGREE | FRIENDS/CUSTOM | |
| EMPLOYER | FRIENDS/CUSTOM | |
| NO 1 AREA OF INTEREST | FRIENDS/CUSTOM | |
| NO 2 AREA OF INTEREST | FRIENDS/CUSTOM | |
| NO 3 AREA OF INTEREST | FRIENDS/CUSTOM | |
| BIRTHDAY | FRIENDS/CUSTOM | |
| SEX | FRIENDS/CUSTOM | |
| RELATIONSHIP STATUS | FRIENDS/CUSTOM | |
| SPOUSE'S FIRST NAME | FRIENDS/CUSTOM | |
| SPOUSE'S LAST NAME | FRIENDS/CUSTOM | |
| NUMBER OF CHILDREN | FRIENDS/CUSTOM | |
| FRIENDS | NONE/CUSTOM | LIST OF FRIENDS |
| ACQUAINTANCES | NONE/CUSTOM | LIST OF ACQUAINTANCES |
| FOLLOWERS | NONE/CUSTOM | LIST OF FOLLOWERS |
| FOLLOWING | NONE/CUSTOM | LIST OF USERS WHOSE FOLLOWER IS THIS USER |
| USER GROUPS | FRIENDS/CUSTOM | USER DEFINED LISTS OF FRIENDS AND ACQUAINTANCES |
| COLLABORATION GROUP | FRIENDS/CUSTOM | LIST OF GROUPS OF COMMON INTEREST OF WHICH THE USER IS A PART OF |
| COLLABORATION HOSTING HISTORY | SELF | LINK TO COLLABORATION HISTORY DATABASE STORING DATA (DATE, TIME, DURATION, AND TITLE) OF SESSIONS HOSTED |
| COLLABORATION PARTICIPATION HISTORY | SELF | LINK TO COLLABORATION HISTORY DATABASE STORING DATA (DATE, TIME, DURATION, AND TITLE) OF SESSIONS PARTICIPATED |
| RATING PROFILE PER COLLABORATION HOSTING SESSION | SELF | LINK TO DATABASE OF RATING ACROSS PEOPLE AND TIME FOR EACH OF SESSIONS HOSTED |
| PREFERENCES AND SETTINGS | | |
| DISCOVERABLE | | YES/NO/CONDITIONAL |
| COLLABORATION INVITATION | | OPTIONS:<br>1. CAN BE INVITED ACQUAINTANCES<br>2. CONDITIONAL |

FIG. 4  400

| FIELDS | DESCRIPTION |
|---|---|
| CONTENT - ID | UNIQUE IDENTIFIER FOR THE CONTENT |
| CONTENT OWNER(S) USER-ID(S) | |
| CONTENT TITLE | |
| DESCRIPTION | |
| DURATION | DURATION OF THE CONTENT |
| VIEWING RIGHTS | COLLABORATION GROUPS, FRIENDS, ACQUAINTANCES, FOLLOWERS AND OTHERS WHO HAVE RIGHT TO VIEW THE CONTENT |
| DESIRED RATING PROFILE(S) | LINK TO DATABASE OF OWNER'S DESIRED RATING PROFILE |
| RATING PROFILE | LINK TO DATABASE OF ACTUAL RATING PROFILE FROM AUDIENCE |
| CONSUMPTION HISTORY | LINK TO DATABASE OF CONSUMPTION DATE(S), TIME(S), AUDIENCE, AND RATING PROFILE |

FIG. 5

| PRIVILEGE | FRIEND | ACQUAINTANCE | FOLLOWER | WORLD |
|---|---|---|---|---|
| COLLABORATE WITH THE USER | YES | NO (CAN INVITE AND COLLABORATE) | NO | NO |
| RECEIVE AND SEND MESSAGES FROM AND TO THE USER | YES | YES | NO (CAN RESPOND TO A MESSAGE FROM THE USER) | NO |
| CHAT WITH USER | YES | YES | AT A PREMIUM OR IF USER INITIATES | NO |
| LISTEN AND OR VIEW BROADCAST OF USER'S COLLABORATION SESSION(S) | YES | YES | YES | NO |
| LEAVE COMMENTS ON THE CONTENT BROADCASTED | YES | YES | YES | NOT APPLICABLE |
| VIEW THE USERS NETWORK | NO | NO | NO | |
| REQUEST USER TO BE FRIEND OR ACQUAINTANCE IF CONTENT ADDRESS IS KNOWN | NOT APPLICABLE | NOT APPLICABLE | YES | YES |
| REQUEST USER TO BE FRIEND/ ACQUAINTANCE AT A PREMIUM | NOT APPLICABLE | NOT APPLICABLE | YES | YES |
| DISCOVER USER | NOT APPLICABLE | NOT APPLICABLE | NOT APPLICABLE | NOT APPLICABLE |

SYSTEM AND METHOD FOR VIRTUAL SOCIAL COLOCATION

Benefit is claimed under 35 U.S.C 119(a)-(d) to Indian Provisional Patent Application Ser. No. 1524/CHE/2013 entitled "DIGITAL CONTENT CENTRIC COLLABORATIVE SOCIAL NETWORKING" by Ittiam Systems Pte. Ltd. filed on Apr. 3, 2013 and also to Indian Patent Application Ser. No. 4671/CHE/2013 entitled "SYSTEM AND METHOD FOR VIRTUAL SOCIAL COLOCATION" by Ittiam Systems Pte. Ltd. filed on Oct. 17, 2013 and benefit is claimed under 35 U.S.C 120 to U.S. application Ser. No. 13/965,240 entitled "PLATFORM FOR END POINT AND DIGITAL CONTENT CENTRIC REAL-TIME SHARED EXPERIENCE FOR COLLABORATION" by Ittiam Systems Pte. Ltd. filed on Aug. 13, 2013, also to U.S. application Ser. No. 13/966,299 entitled "SYSTEM AND METHOD FOR TEMPORAL RATING AND ANALYSIS OF DIGITAL CONTENT" by Ittiam Systems Pte. Ltd. filed on Aug. 14, 2013. Also, this application claims benefit to Indian Patent Application Ser. No. 1425/CHE/2013 entitled "PLATFORM FOR END POINT AND DIGITAL CONTENT CENTRIC REAL-TIME SHARED EXPERIENCE FOR COLLABORATION" by Ittiam Systems Pte. Ltd. filed on Mar. 28, 2013 and to Indian Patent Application Ser. No. 4641/CHE/2013 entitled "SYSTEM AND METHOD FOR TEMPORAL RATING AND ANALYSIS OF DIGITAL CONTENT" by Ittiam Systems Pte. Ltd. filed on Oct. 15, 2013.

FIELD OF TECHNOLOGY

Embodiments of the present invention relate to collaborative social networking. More particularly, embodiments of the present invention relate to virtual social colocation.

BACKGROUND

Social networking is an established means of connecting with increasing number of users around the globe based on one or more criteria (e.g., common interest, background and the like). Typically, social networking services offer limited means of collaboration through information sharing via text, images and so on. Further, audio and/or video conferencing services have grown to increasingly offer varying degree of collaboration through simultaneous content (e.g., documents, presentations and the like) sharing. However, interactivity, flexibility and scale of participation, and meaningful connection between users appear to be limited in case of digital media rich content. In effect, most of the above are limited to the paradigm of communicating and sharing content across distance. Participants or users are still confined to an action at a distance paradigm.

BRIEF DESCRIPTION OF THE DRAWINGS

Embodiments of the present invention are illustrated by way of an example and not limited to the figures of the accompanying drawings, in which like references indicate similar elements and in which:

FIG. 1A is a table illustrating scenario-specific settings with predefined and user defined collaboration scenarios, according to one embodiment;

FIG. 1B is a table illustrating a set of predefined collaboration scenarios, according to one embodiment;

FIG. 1C is a screenshot illustrating a set of predefined collaboration scenarios, according to one embodiment;

FIGS. 1D to 1I are screenshots illustrating an example scenario of virtual social colocation, according to one embodiment;

FIG. 4 is a table illustrating an exemplary list of information stored in a profile database (PDB) shown in FIG. 3, according to one embodiment;

FIG. 5 is a table illustrating an exemplary list of information stored in a content information database (CID) shown in FIG. 3, according to one embodiment;

FIG. 7 is a table illustrating a set of privileges of the user's friends, acquaintances, followers and the World, according to one embodiment.

Other features of the present embodiments will be apparent from the accompanying drawings and from the detailed description that follows.

DETAILED DESCRIPTION

A system and method for virtual social colocation are disclosed. In the following detailed description of the embodiments of the invention, reference is made to the accompanying drawings that form a part hereof, and in which are shown, by way of illustration, specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The term "virtual social colocation" refers to simulating a condition that two or more participants (also referred as users) will experience as if they were located at the same place and at the same time with access to and possible manipulation of the same content of interest and with means to communicate and interact with each other. Further, the term "first end point" refers to an end point of a user who is virtually colocated. Further, the term "second end point" refers to an end point of a user acting as an audience.

Figure 1:
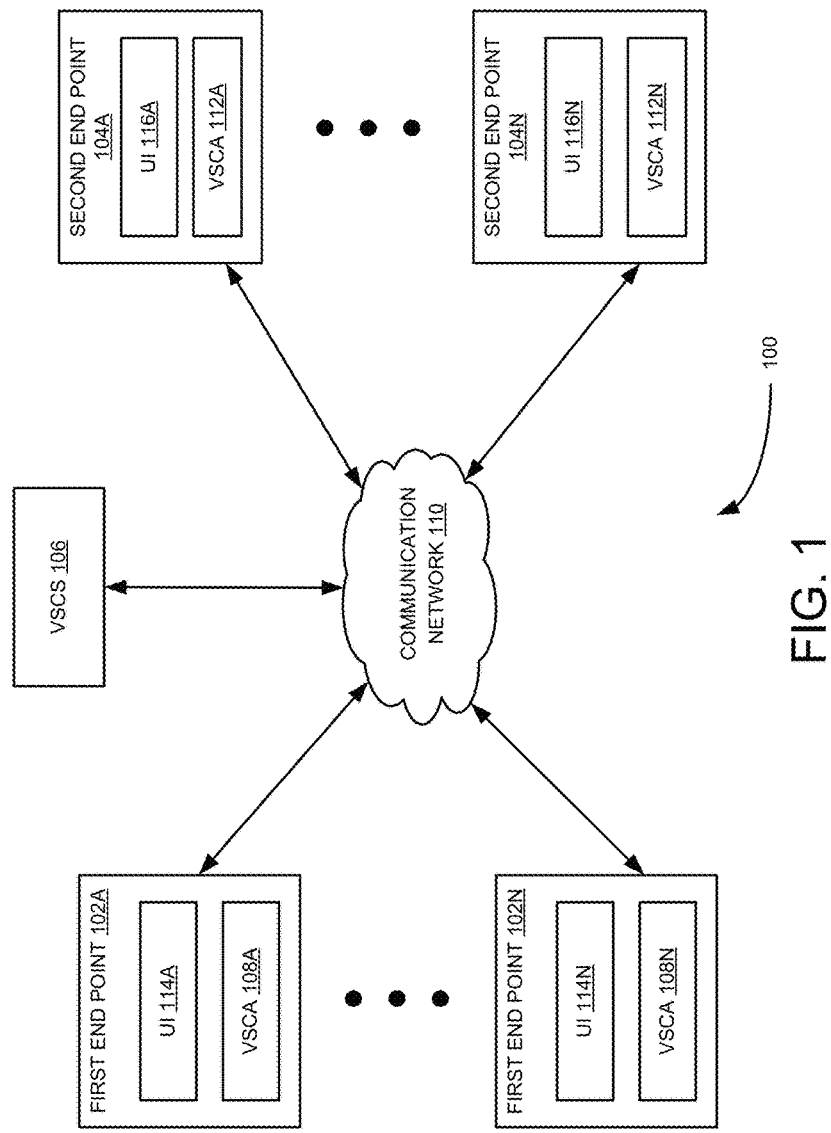
FIG. 1 illustrates a system for virtual social colocation, according to one embodiment.

FIG. 1 illustrates a system 100 for virtual social colocation, according to one embodiment. As shown in FIG. 1, the system 100 includes a plurality of first end points 102A-N, a plurality of second end points 104A-N and a virtual social colocation service (VSCS) 106. For example, the first end points 102A-N and the second end points 104A-N include a tablet, a mobile device, a personal computer (PC), appliances, machines and gadgets (AMGs) with ability to produce and/or consume digital content and the like. Further, the first end points 102A-N and the second end points 104A-N include virtual social colocation applications (VSCAs) 108A-N and 112A-N, respectively.

Furthermore as shown in FIG. 1, the first end points 102A-N, the second end points 104A-N and the VSCS 106 are communicatively connected via a communication network 110. For example, the communication network 110 includes an Internet protocol (IP) network and the like. In one example, the VSCS 106 may be hosted in a cloud based infrastructure that is centralized and/or distributed.

In operation, two or more first users associated with two or more of the first end points 102A-N and zero or more of second users associated with zero or more of the second end points 104A-N register with the VSCS 106 via the communication network 110. In one example, the first users include users who are virtually colocated for collaboration. The collaboration may include social collaboration and/or professional collaboration. In one scenario, the second users associated with the second end points 104A-F are registered with the VSCS 106. In this scenario, the second users include audience, such as friends, acquaintance, followers of the first users. Further in one exemplary scenario, the second users associated with the second end points 104G-N are users of the Internet (e.g., the World) and are not registered to the VSCS 106. This is explained in more detail with reference to FIGS. 6 and 7. In one example embodiment, the VSCAs 108A-N and 112A-N allow the associated first users or second users to select one of a plurality of predefined collaboration scenarios or user(s) defined collaboration scenarios (e.g., music, picture, video, meeting, tutor and the like) via respective user interfaces (UIs) 114A-N and 116A-N based on a type of collaboration use-case. In one example, the first users and the second users are also allowed to create and store the user defined collaboration scenarios with a choice of settings in a list of the predefined collaboration scenarios. For example, a table 100A that illustrates scenario-specific settings with predefined and user defined collaboration scenarios is shown in FIG. 1A and a table 100B that illustrates a set of predefined collaboration scenarios and corresponding settings is shown in FIG. 1B. Also, a screenshot 100C that illustrates an example set of predefined collaboration scenarios is shown in FIG. 1C.

Further, one of the first end points 102A-N (e.g., 102A) enables bridging of digital content and audio and/or video streams (e.g., real-time mic/camera signals or any other stored digital audio and/or video content) originating from the first end point 102A and incoming audio and/or video streams (e.g., real-time mic/camera signals or any other stored digital audio and/or video content) from remaining first end points 102B-N via the communication network 110. In this case, the digital content, residing in the first end point 102A, includes animation, audio streams, video streams, images, graphics, text and the like used for collaboration. In one embodiment, the first end point 102A creates an audio and/or video stream by mixing the digital content and the audio and/or video streams originating from the first end point 102A. The first end point 102A then bridges the created audio and/or video stream and the incoming audio and/or video streams.

Furthermore, the first end point 102A creates one or more first integrated audio and/or video streams and a second integrated audio and/or video stream based on the digital content and the audio and/or video streams originating from the first end point 102A and the incoming audio and/or video streams. In addition, the first end point 102A sends the first integrated audio and/or video streams to the associated remaining first end points 102B-N and the second integrated audio and/or video stream to the VSCS 106 via the communication network 110. While the first integrated audio and/or video streams being sent to the remaining of the first end points 102B-N are intended for consumption of the remaining first end points and the second integrated audio and/or video stream sent to the VSCS 106 is meant for the consumption of the second end points 104A-N and may be bridged differently at the first end point 102A.

In one example scenario, where the first users associated with the first end points 102A-C are virtually colocated for collaboration, one of the first end points 102A-C (e.g., 102A) creates two first integrated audio and/or video streams for the first end points 102B-C and a second integrated audio and/or video stream for the second end points 104A-N. For example, the first integrated audio and/or video stream for the first end point 102B is created using the digital content and audio and/or video streams of the first end point 102A and the audio and/or video streams of the first end point 102C. Further in this example, the first integrated audio and/or video stream for the first end point 102C is created using the digital content and audio and/or video streams of the first end point 102A and the audio and/or video streams of the first end point 102B. Furthermore in this example, the second integrated audio and/or video stream for the second end points 104A-N is created using the digital content and audio and/or video streams of the first end point 102A, the audio and/or video streams of the first end point 102B and the audio and/or video streams of the first end point 102C.

In one example embodiment, the first end point 102A can bridge and send the digital content and the audio and/or video streams originating from the first end point 102A and the incoming audio and/or video streams to the VSCS 106. Alternately, each of the first end points 102A-N can also send the audio and/or video streams originating from the respective first end points to the VSCS 106. The VSCS 106 then creates the first integrated audio and/or video streams and the second integrated audio and/or video stream based on the digital content and the audio and/or video streams from the first end points 102A-N. The VSCS 106 then sends the first integrated audio and/or video streams to the respective first end points 102A-N. In the example scenario, where the first users associated with the first end points 102A-C are virtually colocated for collaboration, the VSCS 106 creates three first integrated audio and/or video streams for the first end points 102A-C and a second integrated audio and/or video stream for the second end points 104A-N.

Moreover, the VSCS 106 broadcasts the second integrated audio and/or video stream to the second end points 104A-N for viewing and/or listening via the communication network 110. In one example, the VSCS 106 broadcasts, in real-time, the second integrated audio and/or video stream to the second end points 104A-N for viewing and/or listening via the communication network 110. In another example, the first end point 102A and/or the VSCS 106 records the second integrated audio and/or video stream and the VSCS 106 broadcasts the pre-recorded audio and/or video stream to the second end points 104A-N for viewing and/or listening via the communication network 110. This is explained in more detail with reference to FIGS. 2 and 3.

Figure 1D:
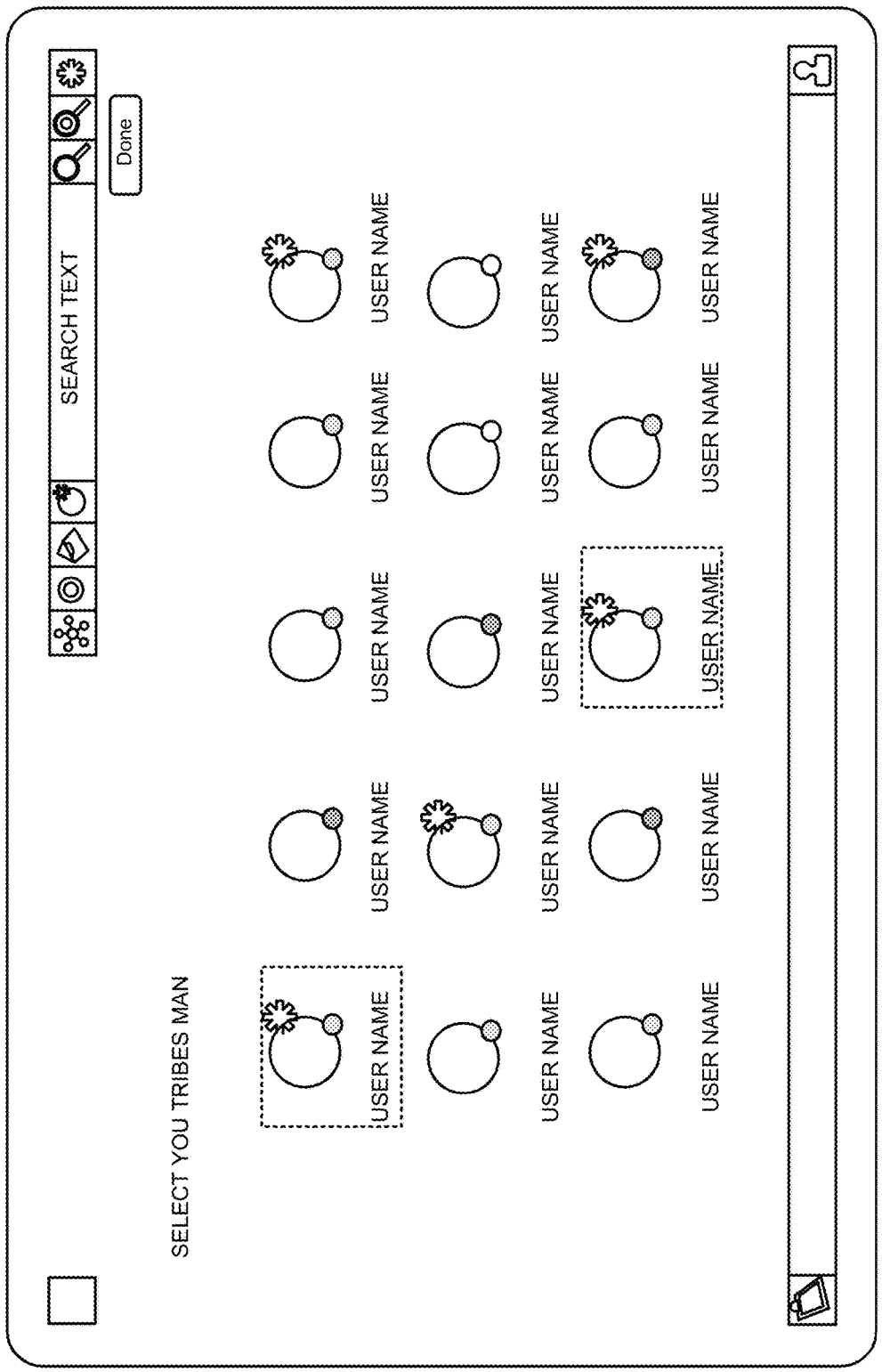
Figure 1G:
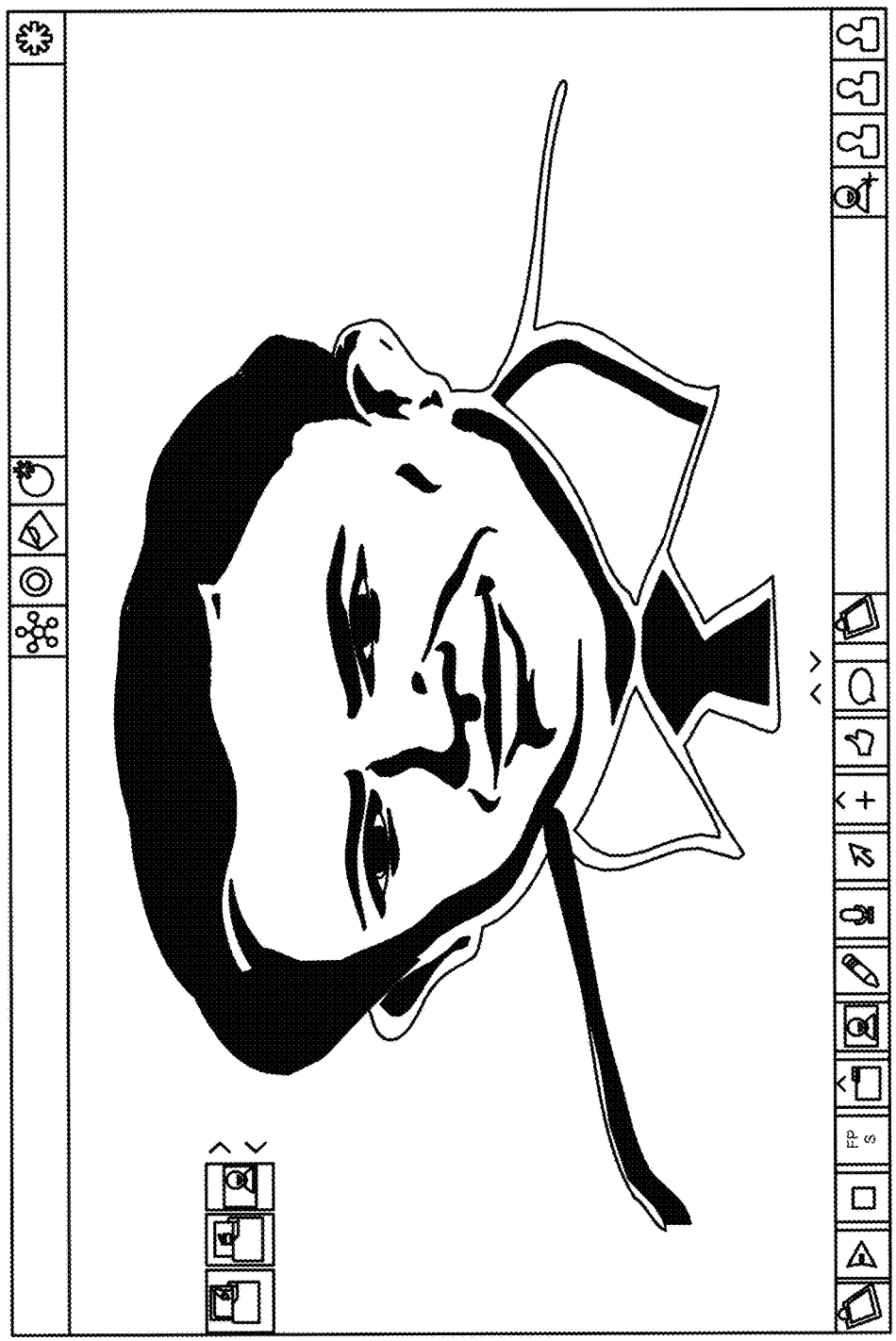
Figure 1H:
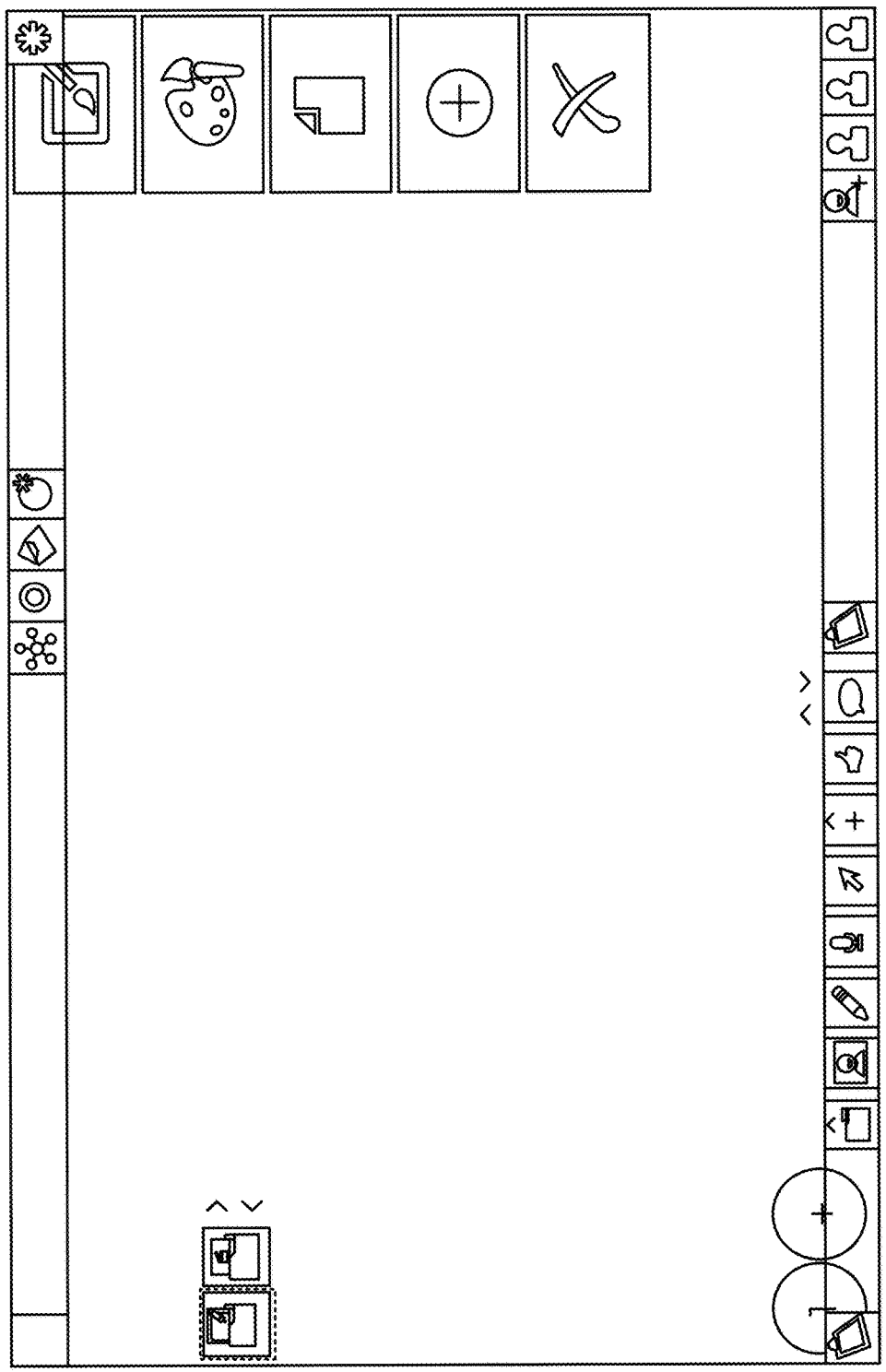
Figure 1I:
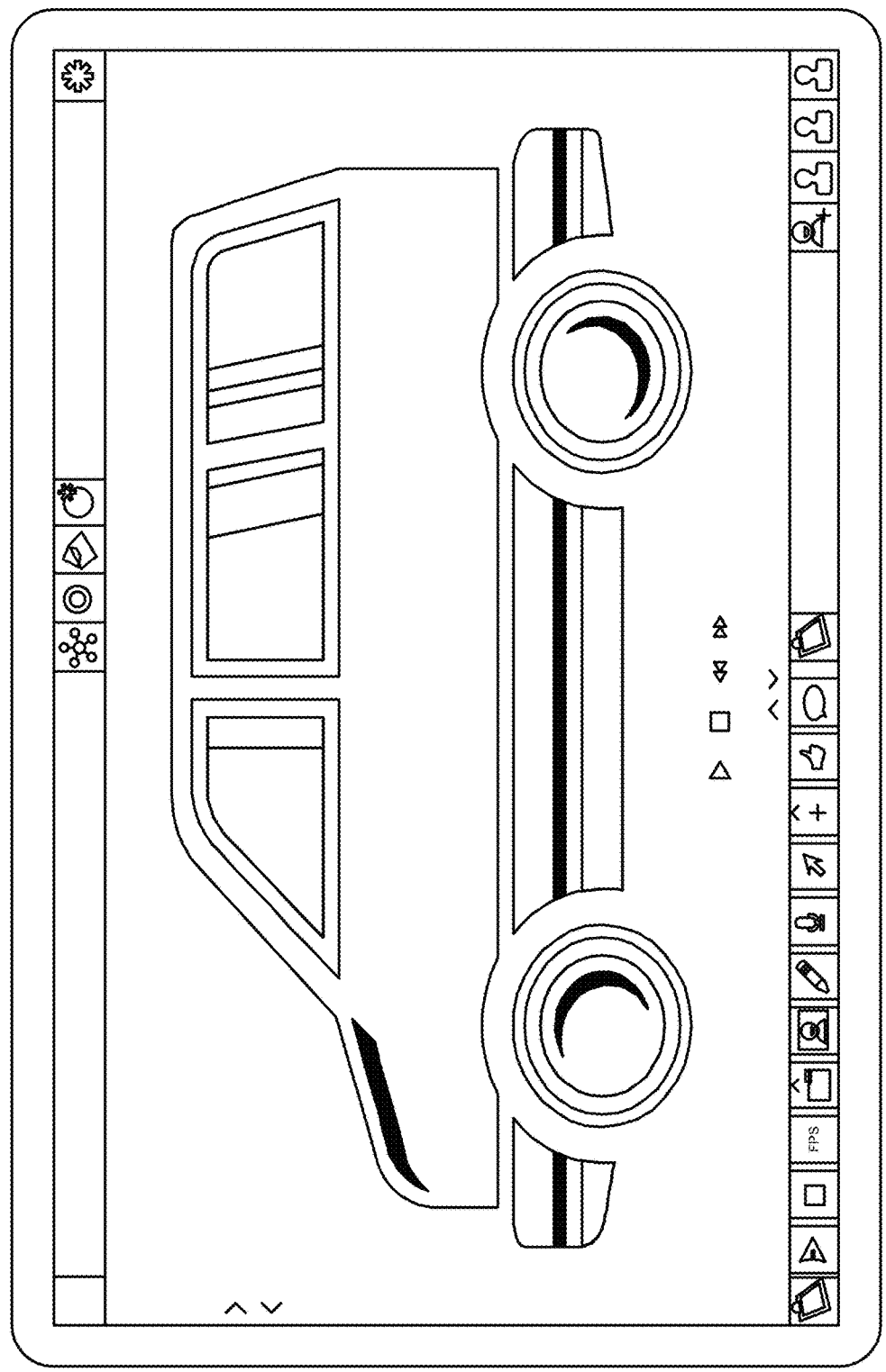

In one example scenario, when a user selects a training collaboration scenario, the user selects other users to whom the user wants to train from user's contact list and virtually colocates with the other users (see FIGS. 1D and 1E). Further, the user selects content from a content page, for example, an image, a video, and a notepad (see FIG. 1F). The user can then train the other users by using the notepad, image or video. The user can also see the other users during the training session. The user can also switch between the contents when the user is teaching to the other users (see FIGS. 1G-1I).

Figure 2:
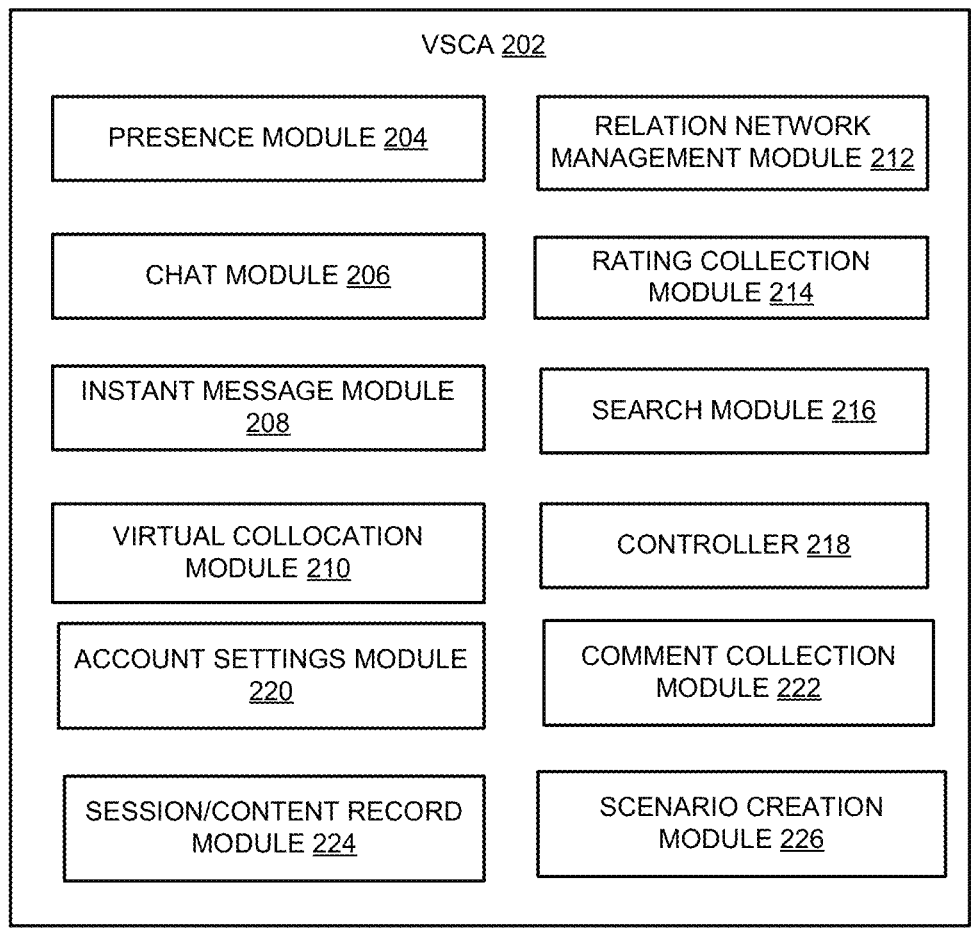
FIG. 2 is a block diagram illustrating some of the components of a virtual social colocation application (VSCA), shown in FIG. 1, according to one embodiment.

Referring now to FIG. 2, which is a block diagram 200 illustrating some of the components of a VSCA 202, such as the VSCAs 108A-N and 112A-N shown in FIG. 1, according to one embodiment. As shown in FIG. 2, the VSCA 202 includes a presence module (PRM) 204, a chat module (CTM) 206, an instant message module (IEM) 208, a virtual colocation module (VCOM) 210, a relation network management module (RLNM) 212, a rating collection module (RM) 214, a search module (SEM) 216, a controller 218, an account settings module (ASM) 220, a comment collection module (CCM) 222, a session/content record module (SCRM) 224 and a scenario creation module 226.

In one embodiment, the VCOM 210 receives and appropriately bridges digital content and audio and/or video streams originating from one of first end points (e.g., the first end points 102A-N shown in FIG. 1) and incoming audio and/or video streams from remaining first end points. Further, the VCOM 210 creates one or more first integrated audio and/or video streams and a second integrated audio and/or video stream based on the digital content and the audio and/or video streams originating from the one of the first end points and the incoming audio and/or video streams. The VCOM 210 then sends the first integrated audio and/or video streams to the remaining first end points as necessary, to create a shared experience in real-time and the second integrated audio and/or video stream to a VSCS (e.g., the VSCS 106 shown in FIG. 1) for broadcasting to second end points (e.g., the second end points 104A-N of FIG. 1) via a communication network (e.g., the communication network 110 of FIG. 1). In one example embodiment, the VCOM 210 bridges the digital content and the audio and/or video streams originating from the one or more of the first end points and sends the output of bridging to the VSCS for creating the first integrated audio and/or video streams and the second integrated audio and/or video stream.

Further, the RM 214 collects, checks and manages ratings, provided by the first end points and second end points (e.g., the second end points 104A-N shown in FIG. 1), on associated one of the first integrated audio and/or video streams and the second integrated audio and/or video stream and sends the ratings to the VSCS. In one example, the RM 214 collects, does sanity checks and manages the ratings for a specific digital content/session before sending to the VSCS for processing, storage and analytics.

Furthermore, the CCM 222 collects comments, on the associated one of the first integrated audio and/or video streams and the second integrated audio and/or video stream, from the first end points and the second end points and sends the collected comments to the VSCS for storage. In addition, the SEM 216 allows the associated user to send a search query to the VSCS for information on profiles, contents, comments, timelines and the like. Moreover, the PRM 204 publishes or sends the associated user's online status to the VSCS and gets notifications of presence information of the associated user's friends and acquaintances from the VSCS. In one embodiment, the VSCS uses the associated user's online status information for tracking and notifying to other users who have requested for the associated user's presence information.

Also, the CTM 206 works in tandem to the VSCS to enable chat between two users or a group of users in the communication network and to exchange text and binary files. Further, the RLNM 212 allows the associated user to manage the network and relationships maintained on the VSCS. Furthermore, the SCRM 224 records the second integrated audio and/or video stream and sends the recorded audio and/or video stream to the VSCS for storing and broadcasting. In addition, the ASM 220 collects and sends necessary information from the users required for the profiles, preferences, privacy and security settings to the VSCS for storage and processing. Moreover, the MEM 208 is a short messaging service which allows the associated user to send short messages to other users in the communication network. Also, the controller 218 includes logic to decide on each of collaboration use-cases and controls interaction between various modules. Further, the scenario creation module 226 allows the first users and the second users to create and store the user defined collaboration scenarios with a choice of settings in a list of predefined collaboration scenarios.

Figure 3:
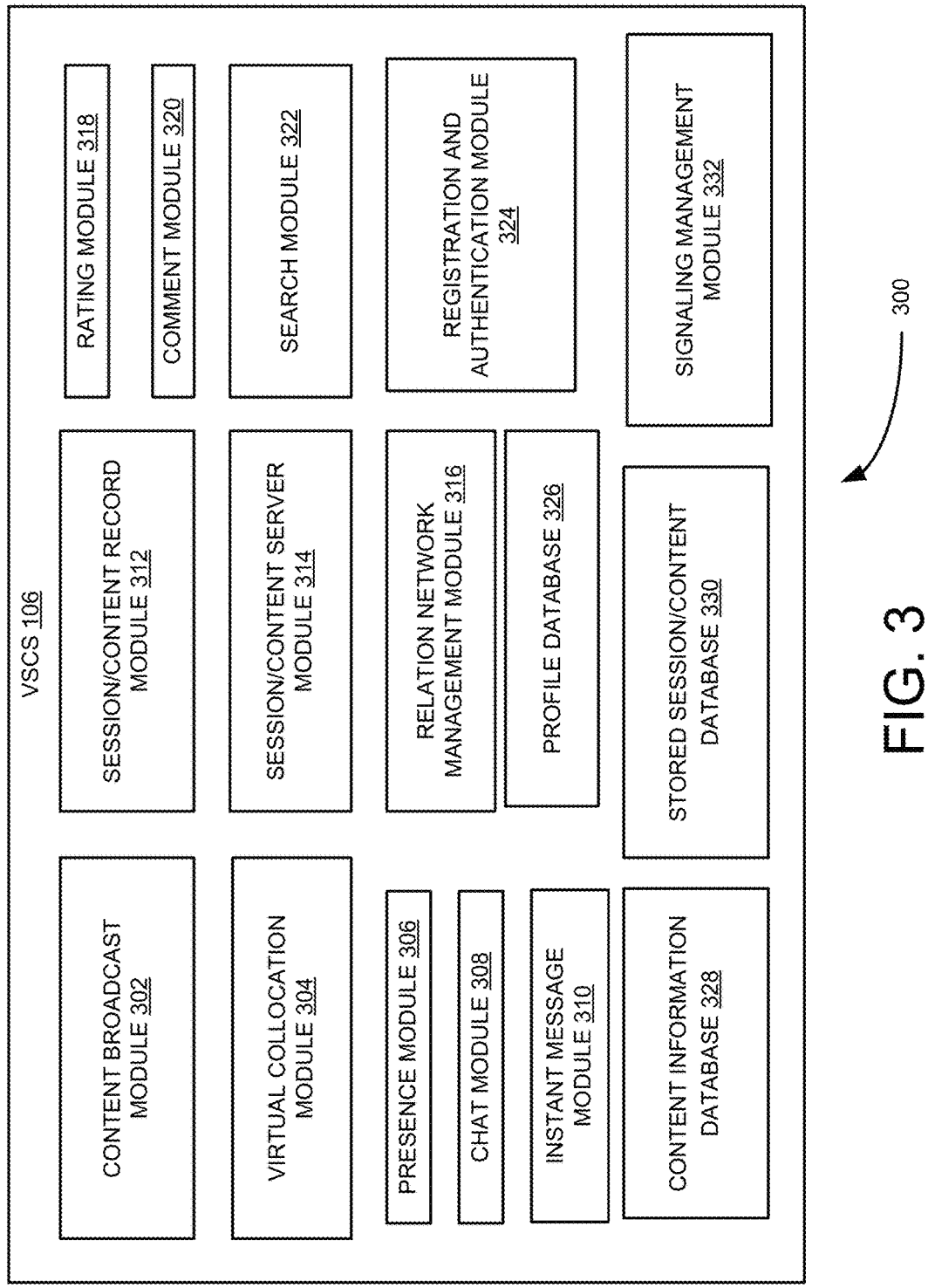
FIG. 3 is a block diagram illustrating some of the components of a virtual social colocation service (VSCS), such as the one shown in FIG. 1, according to one embodiment.

Referring now to FIG. 3, which is a block diagram 300 illustrating some of the components of the VSCS 106, according to one embodiment. As shown in FIG. 3, the VSCS 106 includes a content broadcast module (CBM) 302, a virtual colocation module (VCCM) 304, a presence module (PM) 306, a chat module (CHM) 308, an instant message module (MM) 310, a session/content record module (SCRDM) 312, a session/content server module (SCSM) 314, a relation network management module (RNMM) 316, a rating module (RAM) 318, a comment module (CM) 320, a search module (SM) 322, a registration and authentication module (RGAM) 324, a profile database (PDB) 326, a content information database (CID) 328, a stored session/content database (SSCDB) 330 and a signaling management module (SGMM) 332.

In one embodiment, the VCCM 304 receives the second integrated audio and/or video stream from the one of the first end points. In one example embodiment, the VCCM 304 receives the compressed digital content and the audio and/or video streams originating from the one or more of the first end points and then creates the first integrated audio and/or video streams and the second integrated audio and/or video stream. The VCCM 304 then sends the first integrated audio and/or video streams to the first end points to create a shared experience in real-time via the communication network. In one example, the VCCM 304 centrally manages the signaling between the VSCAs of the first end points. Further in this embodiment, the CBM 302 broadcasts the second integrated audio and/or video stream to the second end points. In other words, the CBM 302 broadcasts live or pre-recorded collaboration session for people outside the collaboration including friends, acquaintances, followers, and the World to view as audience. In one example, the CBM 302 broadcasts the second integrated audio and/or video stream or the pre-recorded audio and/or video stream coming from the VSCA 202, shown in FIG. 2, to the second points via the communication network.

Further, the SCRDM 312 records the second integrated audio and/or video stream in the SSCDB 330. In addition, the SCSM 314 streams the pre-recorded audio and/or video stream in the SSCDB 330 for off-line consumption by the second end points. In other words, SCSM 314 streams out the pre-recorded audio and/or video stream in the SSCDB 330 for off-line consumption by authorized people including friends, acquaintances, followers and the World on associated first and second endpoints. Moreover, the RAM 318 receives ratings from the first endpoints and the second end points on an associated audio and/or video stream (e.g., the first integrated audio and/or video stream and second integrated or pre-recorded audio and/or video stream). In one example, the RAM 318 receives ratings, based on predefined criteria, on the associated audio and/or video stream from a RM (e.g., the RM 214 of FIG. 2) in the VSCAs in the first and second endpoints of the collaborators and audience, respectively. The RAM 318 then processes the received ratings, analyses the ratings based on demographic profile of the user and the like and stores the ratings and results and makes the results available to authorized users. Also, the CM 320 receives and processes comments from the second end points and first end points on the audio and/or video stream. Further, the SM 322 allows the first users and the second users to search the SSCDB 330 for profiles, contents, comments, and timelines depending on authorization.

Furthermore, the RGAM 324 manages registration of a new user and authenticates on identity of the new user. In addition, the PM 306 tracks online presence and status of the first users and the second users and shares the tracked information with an associated user network, if allowed by the respective users. Moreover, the CHM 308 enables chat between the first users and the second users. Also, the SGMM 332 manages signaling sessions required to connect the first end points. Further, the RNMM 316 manages the network and relationship information of the first users and second users. Furthermore, the MM 310 which is a short messaging service using which the associated users send short messages to other users. In addition, the PDB 326 stores a profile of each of the registered first users and second users. For example, a table showing a list of information stored in the PDB 326 is shown in FIG. 4. Also, the CID 328 stores information associated with the digital content. For example, a table showing a list of information stored in the CID 328 is shown in FIG. 5.

Figure 6:
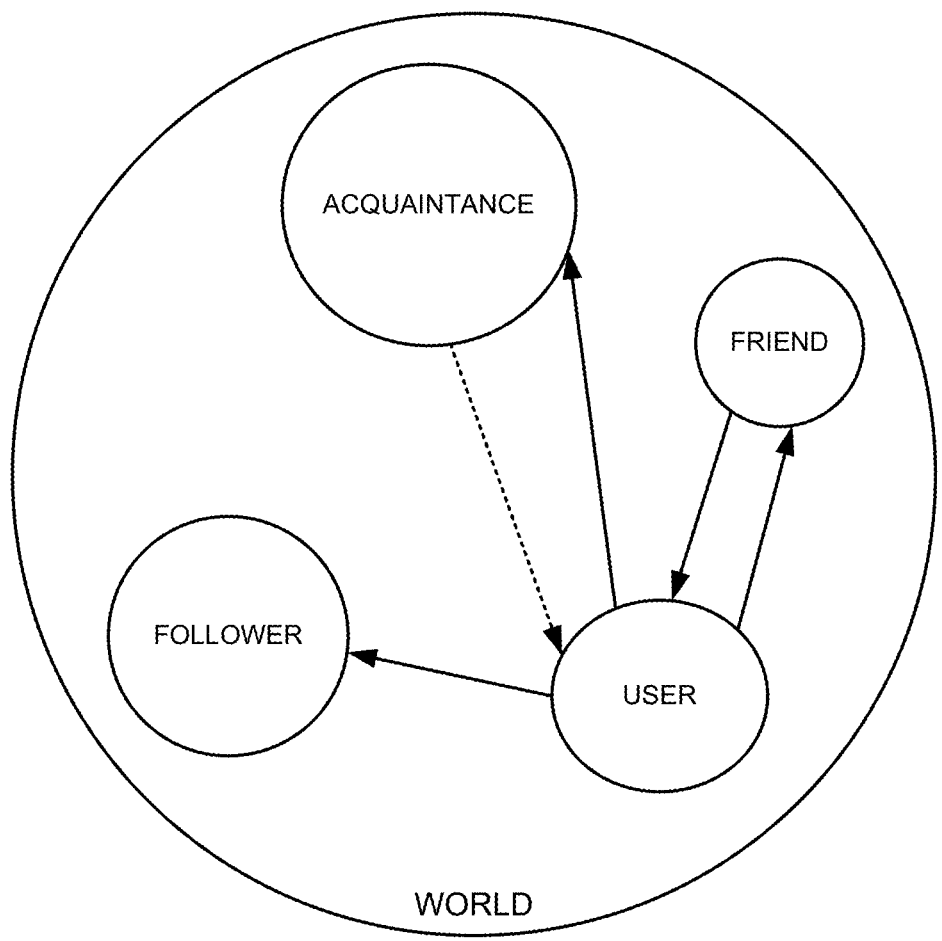
FIG. 6 is a schematic showing possible networking relationships of a user, in the context of the present invention.

Referring now to FIG. 6, which is a schematic 600 showing possible networking relationships of a user, in the context of the present invention. As shown in FIG. 6, the possible networking relationships of the user include friends, acquaintances, followers and the World. For example, the friends are a group of people who are registered users and are part of a user's network and also share a relationship with specific privileges. Further, the acquaintances are a group of people who are registered users and are part of the user's network and also share a relationship with limited privileges compared to the friends. Furthermore, the followers are a group of people who are registered users and are part of the user's network and also share a relationship with limited privileges compared to the acquaintances. In addition, the World is the people who are outside user's network and do not share a relationship and also have very limited privileges. For example, the set of privileges of the friends, acquaintances, and followers of the users and the world are shown in FIG. 7.

Figure 8:
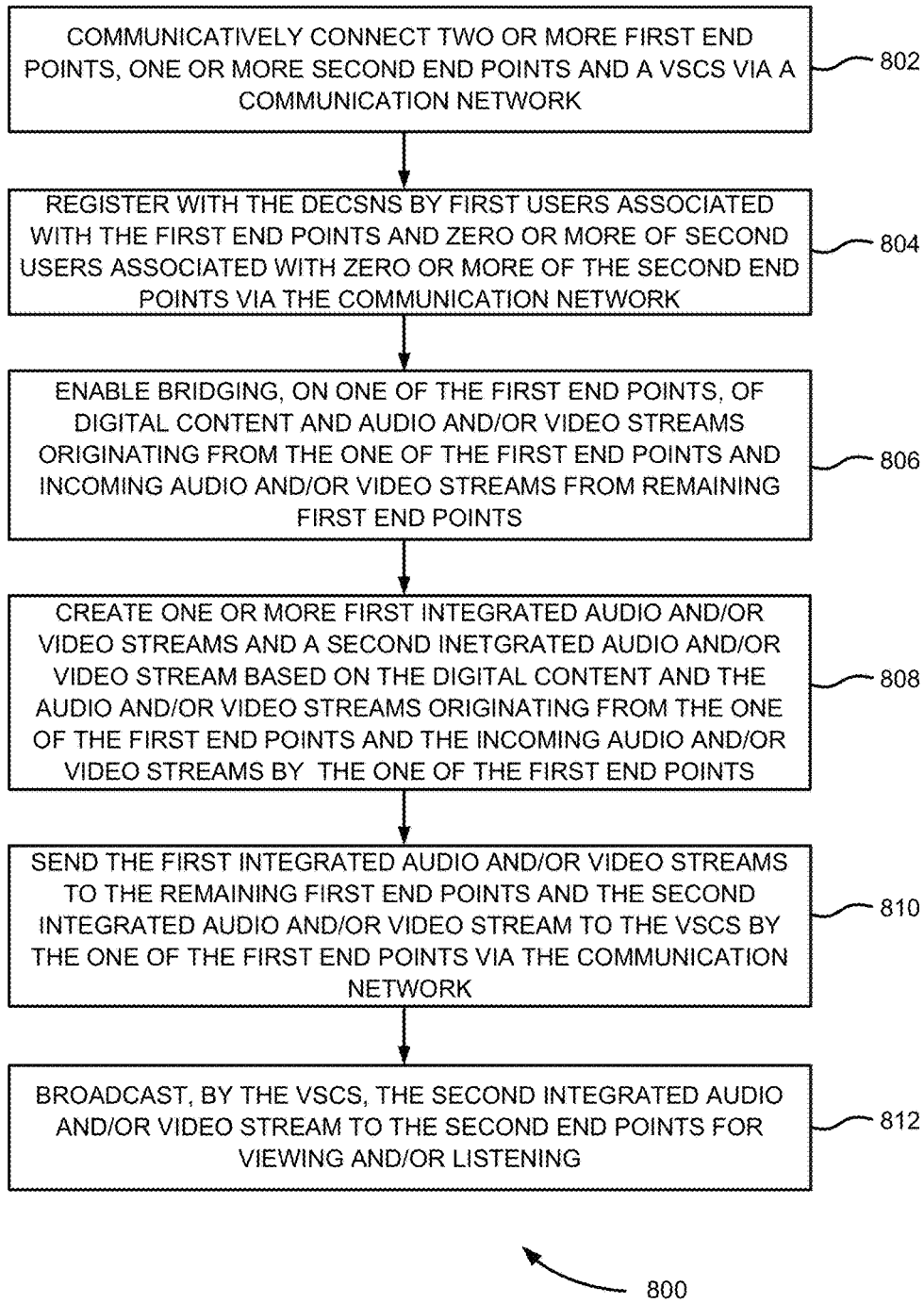
FIG. 8 illustrates a process flow for virtual social colocation, according to one embodiment.

Referring now to FIG. 8, which illustrates a process flow 800 for virtual social colocation, according to one embodiment. At block 802, two or more first end points, one or more second end points and a VSCS are communicatively connected via a communication network. At block 804, first users associated with the first end points and zero or more of second users associated with zero or more of the second end points are registered with the VSCS via the communication network. At block 806, bridging of digital content and audio and/or video streams originating from one of the first end points and incoming audio and/or video streams from remaining first end points is enabled on the one of the first end points via the communication network. At block 808, one or more first integrated audio and/or video streams and a second integrated audio and/or video stream are created based on the digital content and the audio and/or video streams originating from the one of the first end points and the incoming audio and/or video streams by the one of the first end points. At block 810, the first integrated audio and/or video streams are sent to remaining first end points and the second integrated audio and/or video stream is sent to the VSCS by the one of the first end points via the communication network. At block 812, the second integrated audio and/or video stream is broadcasted, by the VSCS, to the second end points for viewing and/or listening via the communication network. This is explained in more detail with reference to FIG. 1.

In various embodiments, the systems and methods described in FIGS. 1-8 propose a technique for virtual social colocation with dynamic participation and audience among users with defined relationships. Using this technique, all the first users can view each other and the digital content being shared and can discuss over the digital content. Further, the second users acting as audience can watch the digital content and collaborators and can also listen to the conversation. Furthermore, the users have the choice of selecting an appropriate collaboration scenario based on a type of collaboration the user intends and hence optimizing the collaboration experience. Thus, using the above technique interactivity, flexibility and scale of participation, and meaningful connection between users is increased in case of digital media rich content.

In one embodiment, an article comprising a non-transitory computer readable storage medium having instructions thereon which when executed by a computing platform result in execution of the above mentioned method. The method described in the foregoing may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method for virtual social colocation, comprising:
communicatively connecting at least two first end points, at least one second end point and a virtual social colocation service (VSCS) via a communication network, wherein each of the at least two first end points comprises a virtual social colocation application (VSCA), wherein the at least two first end points include end points of first users who are virtually colocated for collaboration, and wherein the at least one second end point includes an end point of at least one second user, wherein the at least one second user comprises an audience;
bridging, on one of the at least two first end points, of digital content and audio and/or video streams originating from the one of the at least two first end points and incoming audio and/or video streams from remaining first end points via the communication network by the VSCA residing in the one of the at least two first end points;
creating one or more first integrated audio and/or video streams and a second integrated audio and/or video stream based on the digital content and the audio and/or video streams originating from the one of the at least two first end points and the incoming audio and/or video streams from at least one of the remaining first end points by the VSCA in the one of the at least two first end points, wherein creating the one or more first integrated audio and/or video streams and the second integrated audio and/or video stream by the VSCA in the one of the at least two first end points comprises:

creating the one or more first integrated audio and/or video streams for the at least two first end points using the digital content and audio and/or video streams originated/received from appropriately chosen first end points; and creating the second integrated audio and/or video stream for the at least one second end point using the digital content and the audio and/or video streams originating from all the at least two first end points;

sending the one or more first integrated audio and/or video streams to the remaining first end points to enable interaction between the at least two first end points and the second integrated audio and/or video stream to the VSCS by the VSCA in the one of the at least two first end points via the communication network; and broadcasting, by the VSCS, the second integrated audio and/or video stream to the at least one second end point for viewing and/or listening via the communication network, wherein the one or more first integrated audio and/or video streams and the second integrated audio and/or video stream are simultaneously sent to the remaining first end points and the VSCS, respectively.

2. The method of claim 1, further comprising:

registering with the VSCS by the first users associated with the at least two first end points and the at least one second user associated with the at least one second end point via the communication network.

3. The method of claim 2, wherein the audience is selected from the group consisting of a friend, acquaintance and follower of the first users or any user of the Internet.

4. The method of claim 1, wherein sending the one or more first integrated audio and/or video streams to the remaining first end points by the one of the at least two first end points via the communication network, comprises:

real-time sending the one or more first integrated audio and/or video streams to the remaining first end points by the one of the at least two first end points via the communication network.

5. The method of claim 1, wherein broadcasting, by the VSCS, the second integrated audio and/or video stream to the at least one second end point via the communication network, comprises:

real-time broadcasting, by the VSCS, the second integrated audio and/or video stream to the at least one second end point for viewing and/or listening via the communication network.

6. The method of claim 1, wherein the VSCA includes a virtual colocation module (VCOM) for receiving and appropriately bridging the digital content and the audio and/or video streams originating from the one of the at least two first end points and the incoming audio and/or video streams from the at least one of the remaining first end points, wherein the VCOM further creates the one or more first integrated audio and/or video streams and the second integrated audio and/or video stream based on the digital content and the audio and/or video streams originating from the one of the at least two first end points and the incoming audio and/or video streams from the at least one of the remaining first end points and wherein the VCOM further sends the one or more first integrated audio and/or video streams to the remaining first end points to create a shared experience, in real-time, and the second integrated audio and/or video stream to the VSCS for broadcasting to the at least one second end point via the communication network.

7. The method of claim 6, wherein the VSCA further comprises a rating collection module (RM) for collecting, checking and managing ratings, provided by the at least two first end points and the at least one second end point, on associated one of the one or more first integrated audio and/or video streams and the second audio and/or video stream and for sending the ratings to the VSCS, wherein the VSCA further comprises a comment collection module (CCM) for collecting comments, on the associated one of the one or more first integrated audio and/or video streams and the second audio and/or video stream, from the at least two first end points and the at least one second end point and for sending the collected comments to the VSCS for storage, and wherein the VSCA further comprises a search module (SEM) for allowing an associated user to send a search query to the VSCS for information on profiles, contents, comments, and timelines.

8. The method of claim 7, wherein the VSCA further comprises a presence module (PRM) for publishing the associated user's online status to the VSCS, getting notifications of the presence information of the associated user's friends and acquaintances from the VSCS and sending the users online status information to the VSCS for tracking and notifying to other users who have requested for the associated user's presence information, wherein the VSCA further comprises a chat module (CTM) for working in tandem to the VSCS for exchanging text and binary files and wherein the VSCA further comprises a relation network management module (RLNM) for allowing the associated user to manage the network and relationships maintained on the VSCS.

9. The method of claim 8, wherein the VSCA further comprises a session/content record module (SCRM) for recording the second integrated audio and/or video stream and sending the recorded audio and/or video stream to the VSCS for storing and broadcasting, wherein the VSCA further comprises an account settings module (ASM) for collecting and sending necessary information from the users required for the profiles, preferences, privacy and security settings to the VSCS for storage and processing, wherein the VSCA further comprises an instant messaging module (MEM) to allow the associated user to send short messages to other users in the communication network and wherein the VSCA further comprises a controller to control interaction between various modules and to include logic to decide on each of collaboration use-cases.

10. The method of claim 1, wherein the VSCS comprises a virtual colocation module (VCCM) for receiving the second integrated audio and/or video stream from the one of the at least two first end points via the communication network and wherein the VSCS further comprises a content broadcast module (CBM) for broadcasting the second integrated audio and/or video stream to the at least one second end point.

11. The method of claim 10, wherein the VSCS further comprises a rating module (RAM) for receiving ratings from the at least two first endpoints and the at least one second end point on associated one of the one or more first integrated audio and/or video streams and the second audio and/or video stream, wherein the VSCS further includes a comment module (CM) for receiving and processing comments from the at least two first end points and the at least one second end point, wherein the VSCS further includes a session/content record module (SCRDM) for recording the second integrated audio and/or video stream in a stored session/ content database (SSCDB), wherein the VSCS further comprises a session/content server module (SCSM) for streaming the pre-recorded audio and/or video stream in the SSCDB for off-line consumption by the at least one second end point and wherein the VSCS further includes a search module (SM) for allowing the first users associated with the at least two first end points and the at least one second user associated with the at least one second end point to search the SSCDB for profiles, contents, comments, and timelines.

12. The method of claim 11, wherein the VSCS further includes a registration and authentication module (RGAM) for managing registration of a new user and for authenticating on identity of the new user, wherein the VSCS further includes a presence module (PM) for tracking online presence and status of the first users and the at least one second user and for sharing the tracked information with an associated user network, wherein the VSCS further includes a chat module (CHM) for enabling chat between the two or more of the first users and the at least one second user, wherein the VSCS further includes a signaling management module (SGMM) for managing signaling sessions required to connect the at least two first end points, wherein the VSCS further includes a relation network management module (RNMM) for managing the network and relationship information of the first users and the at least one second user, wherein the VSCS further includes a profile database (PDB) for storing a profile of each of the first users and the at least one second user, wherein the VSCS further includes a content information database (CID) for storing information associated with the digital content and wherein the VSCS further comprises an instant messaging module (MM) to allow the associated user to send short messages to other users in the communication network.

13. The method of claim 1, further comprising:
allowing the first users associated with the at least two first end points and the at least one second user associated with the at least one second end point to select one of a plurality of predefined collaboration scenarios and user defined collaboration scenarios.

14. The method of claim 1, wherein the digital content includes audio streams, video streams, text, images, and/or graphics.

15. The method of claim 1, wherein the at least two first end points and the at least one second end point comprise end points selected from the group consisting of a tablet, a mobile device, a personal computer (PC), and appliances, machines and gadgets (AMGs) with ability to produce and/or consume digital content.

16. The method of claim 1, wherein the VSCS is hosted in a cloud based infrastructure that is centralized and/or distributed.

17. A system, comprising:
at least two first end points, wherein the at least two first end points include end points of first users who are virtually colocated for collaboration;
at least one second end point, wherein the at least one second end point includes an end point of at least one second user, wherein the at least one second user comprises an audience; and
a virtual social colocation service (VSCS), wherein the at least two first end points, the at least one second end point and the VSCS are communicatively connected via a communication network, wherein each of the at least two first end points comprises a virtual social colocation application (VSCA), wherein the VSCA residing in memory and executed by a processor of one of the at least two first end points bridges digital content and audio and/or video streams originating from the one of the at least two first end points and incoming audio and/or video streams from remaining first end points via the communication network, wherein the VSCA in the one of the at least two first end points creates one or more first integrated audio and/or video streams and a second audio and/or video stream based on the digital content and the audio and/or video streams originating from the one of the at least two first end points and the incoming audio and/or video streams from at least one of the remaining first end points, wherein the VSCA in the one of the at least two first end points creates:
the one or more first integrated audio and/or video streams for the at least two first end points using the digital content and audio and/or video streams originated/received from appropriately chosen first end points; and
the second integrated audio and/or video stream for the at least one second end point using the digital content and the audio and/or video streams originating from all the at least two first end points;
wherein the VSCA in the one of the at least two first end points sends the one or more first integrated audio and/or video streams to the remaining first end points to enable interaction between the at lea two first end points and the second integrated audio and/or video stream to the VSCS via the communication network and wherein the VSCS broadcasts the second integrated audio and/or video stream to the at least one second end point for viewing and/or listening via the communication network, wherein the one or more first integrated audio and/or video streams and the second integrated audio and/or video stream are simultaneously sent to the remaining first end points and the VSCS, respectively.

18. The system of claim 17, wherein the VSCS allows the first users associated with the at least two first end points and the at least one second user associated with the at least one second end point to register via the communication network.

19. The system of claim 18, wherein audience is selected from the group consisting of a friend, acquaintance and follower of the first users, or any user of the Internet.

20. The system of claim 19, wherein the one of the at least two first end points is configured to:
send, in real-time, the one or more first integrated audio and/or video streams to the remaining first end points via the communication network.

21. The system of claim 17, wherein the VSCS is configured to:
broadcast, in real-time, the second integrated audio and/or video stream to the at least one second end point for viewing and/or listening via the communication network.

22. The system of claim 17, wherein the VSCA includes a virtual colocation module (VCOM) for receiving and appropriately bridging the digital content and the audio and/or video streams originating from the one of the at least two first end points and the incoming audio and/or video streams from the remaining first end points, wherein the VCOM further creates the one or more first integrated audio and/or video streams and the second integrated audio and/or video stream based on the digital content and the audio and/or video streams originating from the one of the at least two first end points and the incoming audio and/or video streams from the at least one of the remaining first end points and wherein the VCOM further sends the one or more first integrated audio and/or video streams to the remaining first end points to create a shared experience, in real-time, and the second integrated audio and/or video stream to the VSCS for broadcasting to the at least one second end point via the communication network.

23. The system of claim 22, wherein the VSCA further comprises a rating collection module (RM) for collecting, checking and managing ratings, provided by the at least two first end points and the at least one second end point, on associated one of the one or more first integrated audio and/or video streams and the second audio and/or video stream and for sending the ratings to the VSCS, wherein the VSCA further comprises a comment collection module (CCM) for collecting comments, on the associated one of the one or more first integrated audio and/or video streams and the second audio and/or video stream, from the at least two first end points and the at least one second end point and for sending the collected comments to the VSCS for storage, and wherein the VSCA further comprises a search module (SEM) for allowing an associated user to send a search query to the VSCS for information on profiles, contents, comments, and timelines.

24. The system of claim 23, wherein the VSCA further comprises a presence module (PRM) for publishing the associated user's online status to the VSCS, getting notifications of the presence information of the associated user's friends and acquaintances from the VSCS and sending the users online status information to the VSCS for tracking and notifying to other users who have requested for the associated user's presence information, wherein the VSCA further comprises a chat module (CTM) for working in tandem to the VSCS for exchanging text and binary files, wherein the VSCA further comprises a relation network management module (RLNM) for allowing the associated user to manage the network and relationships maintained on the VSCS.

25. The system of claim 24, wherein the VSCA further comprises a session/content record module (SCRM) for recording the second integrated audio and/or video stream and sending the recorded audio and/or video stream to the VSCS for storing and broadcasting, wherein the VSCA further comprises an account settings module (ASM) for collecting and sending necessary information from the users required for the profiles, preferences, privacy and security settings to the VSCS for storage and processing, wherein the VSCA further comprises an instant messaging module (MEM) to allow the associated use to send short messages to other users in the communication network and wherein the VSCA further comprises a controller to control interaction between various modules and to include logic to decide on each of collaboration use-cases.

26. The system of claim 17, wherein the VSCS comprises a virtual colocation module (VCCM) for receiving the second integrated audio and/or video stream from the one of the at least two first end points via the communication network and wherein the VSCS further comprises a content broadcast module (CBM) for broadcasting the second integrated audio and/or video stream to the at least one second end point.

27. The system of claim 26, wherein the VSCS further comprises a rating module (RAM) for receiving ratings from the at least two first endpoints and the at least one second end point on associated one of the one or more first integrated audio and/or video streams and the second audio and/or video stream, wherein the VSCS further includes a comment module (CM) for receiving and processing comments from the at least two first end points and the at least one second end point, wherein the VSCS further includes a session/content record module (SCRDM) for recording the second integrated audio and/or video stream in a stored session/content database (SSCDB) and wherein the VSCS further comprises a session/content server module (SCSM) for streaming the pre-recorded audio and/or video stream in the SSCDB for off-line consumption by the at least one second end point and wherein the VSCS further includes a search module (SM) for allowing the first users associated with the at least two first end points and the at least one second user associated with the at least one second end point to search the SSCDB for profiles, contents, comments, and timelines.

28. The system of claim 27, wherein the VSCS further includes a registration and authentication module (RGAM) for managing registration of a new user and for authenticating on identity of the new user, wherein the VSCS further includes a presence module (PM) for tracking online presence and status of the first users and the at least one second user and for sharing the tracked information with an associated user network, wherein the VSCS further includes a chat module (CHM) for enabling chat between the two or more of the first users and the at least one second user, wherein the VSCS further includes a signaling management module (SGMM) for managing signaling sessions required to connect the at least two first end points, wherein the VSCS further includes a relation network management module (RNMM) for managing the network and relationship information of the first users and the at least one second user, wherein the VSCS further includes a profile database (PDB) for storing a profile of each of the first users and the at least one second user, wherein the VSCS further includes a content information database (CID) for storing information associated with the digital content and wherein the VSCS further comprises an instant messaging module (MM) to allow the associated user to send short messages to other users in the communication network.

29. The system of claim 17, wherein the digital content includes audio streams, video streams, text, images, and/or graphics.

30. The system of claim 17, wherein the at least two first end points and the at least one second end point comprise end points selected from the group consisting of a tablet, a mobile device, a personal computer (PC), and appliances, machines and gadgets (AMGs) with ability to produce and/or consume digital content.

31. A non-transitory computer-readable storage medium having instructions that when executed by a processor, cause the processor to:
communicatively connect at least two first end points, at least one second end point and a virtual social colocation service (VSCS) via a communication network, wherein each of the at least two first end points comprises a virtual social colocation application (VSCA), wherein the at least two first end points include end points of first users who are virtually colocated for collaboration, and wherein the least one second end point includes an end point of at least one second user, wherein the at least one second user comprises an audience;
bridge, on one of the at least two first end points, of digital content and audio and/or video streams originating from the one of the at least two first end points and incoming audio and/or video streams from remaining first end points via the communication network by the VSCA residing in the one of the at least two first end points;
create one or more first integrated audio and/or video streams and a second integrated audio and/or video stream based on the digital content and the audio and/or video streams originating from the one of the at least two first end points and the incoming audio and/or video streams from at least one of the remaining first end points by the VSCA in the one of the at least two first end points, wherein creating the one or more first integrated audio and/or video streams and the second integrated audio and/or video stream by the VSCA in the one of the at least two first end points comprises:

creating the one or more first integrated audio and/or video stream for the at least two first end points using the digital content and audio and/or video streams originated/received from appropriately chosen first end points; and creating the second integrated audio and/or video stream for the at least one second end point using the digital content and the audio and/or video streams originating from all the at least two first end points;

send the one or more first integrated audio and/or video streams to the remaining first end points to enable interaction between the at least two first end points and the second audio and/or video stream to the VSCS by the VSCA in the one of the at least two first end points via the communication network; and broadcast, by the VSCS, the second integrated audio and/or video stream to the at least one second end point for viewing and/or listening via the communication network, wherein the one or more first integrated audio and/or video streams and the second integrated audio and/or video stream are simultaneously sent to the remaining first end points and the VSCS, respectively.

32. The non-transitory computer-readable storage medium of claim 31, wherein the instructions cause the computing device to:

register with the VSCS by the first users associated with the at least two first end points and the at least one second user associated with the at least one second end point via the communication network.

33. The non-transitory computer-readable storage medium of claim 32, wherein the audience is selected from the group consisting of a friend, acquaintance and follower of the first users or any user of the Internet.

\* \* \* \* \*